(No Model.)

R. H. & J. T. WILLIAMS.
PUZZLE.

No. 284,525. Patented Sept. 4, 1883.

WITNESSES:
Otto Hufeland
William Miller

INVENTORS
Richard H. Williams
John T. Williams
BY Van Santvoord & Hauff
their
ATTORNEYS

UNITED STATES PATENT OFFICE.

RICHARD H. WILLIAMS AND JOHN T. WILLIAMS, OF MOUNT VERNON, N. Y.

PUZZLE.

SPECIFICATION forming part of Letters Patent No. 284,525, dated September 4, 1883.

Application filed August 1, 1883. (No model.)

*To all whom it may concern:*

Be it known that we, RICHARD H. WILLIAMS and JOHN T. WILLIAMS, both citizens of the United States, residing at Mount Vernon, in the county of Westchester and State of New York, have invented new and useful Improvements in Puzzles, of which the following is a specification.

This invention consists in a puzzle composed of a number of colored tablets, which, when properly laid side by side, form squares of different colors, each square being of uniform color. A portion of these tablets are in one color, the remainder in two colors. Arbitrary signs may be used to distinguish the squares, the same sign being used in squares having the same colors.

Figure 1:
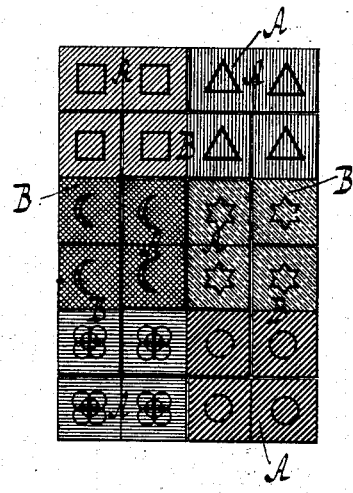
Figure 2:
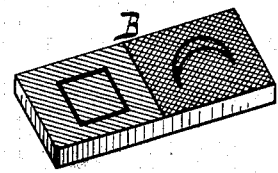

In the accompanying drawings, Figure 1 is a view of the puzzle when laid to form six different-colored squares. Fig. 2 is a view of a two-colored tablet.

Similar letters indicate corresponding parts.

In the drawings, the letter A designates the tablets which have only one color, and B those with two colors, each color covering one-half the length of the surface of the tablets B. The tablets are twice as long as they are wide, so that, when a tablet of one color is laid against the ends of two party-colored tablets of corresponding color a square of that color is formed thereby, as shown in Fig. 1. In addition to the colors, the tablets may be provided with arbitrary signs—such as ornaments, numbers, animals, words, &c.—each color to be represented by a different sign, so that when the tablets are placed together, so as to form the above-described squares of uniform color, each such square will display four similar signs. When the tablets are arranged, as described, to form a series of colored squares, they have a general appearance suggestive of mosaic work.

We do not limit ourselves to any particular number of tablets in carrying out our invention.

What we claim as new, and desire to secure by Letters Patent, is—

1. A puzzle consisting of a series of oblong colored tablets, no two of which are colored alike, forming squares uniform in color when properly laid together, substantially as shown and described.

2. A puzzle consisting of a series of oblong colored tablets, no two of which are colored alike, forming squares uniform in color when properly laid together, provided with arbitrary signs, each color being represented by a different sign, substantially as shown and described.

In testimony whereof we have hereunto set our hands and seal in the presence of two subscribing witnesses.

RICHARD H. WILLIAMS. [L. S.]
JOHN T. WILLIAMS.

Witnesses:
J. VAN SANTVOORD,
OTTO HUFELAND.